3,444,235
PREPARATION OF ADIPONITRILE
Pierre Jean Antoine Chabardès and Charles Camille Dominique Grard, Lyon, and Michel Pierre Francois Thiers, Brignais, France, assignors to Rhone-Poulenc S.A., Paris, France, a French body corporate
No Drawing. Continuation-in-part of application Ser. No. 396,371, Sept. 14, 1964. This application Dec. 13, 1965, Ser. No. 513,527
Claims priority, application France, Sept. 17, 1963, 947,754; Oct. 29, 1963, 952,175; Jan. 14, 1964, 960,256; May 8, 1964, 973,771; Aug. 19, 1964, 985,611; Dec. 23, 1964, 999,774
Int. Cl. C07c *121/02*
U.S. Cl. 260—465.8        11 Claims

ABSTRACT OF THE DISCLOSURE

Adiponitrile is prepared by heating acrylonitrile with a metal carbonyl or derivative thereof, hydrogen, a polymerization inhibitor, and preferably also a hydrogenation inhibitor.

---

This application is a continuation-in-part application of our application Ser. No. 396,371, filed Sept. 14, 1964, now abandoned.

Adiponitrile is a starting material for the preparation of hexamethylenediamine, a constituent of polyamides. It is generally obtained from adipic acid, which is in turn obtained by oxidation of cyclohexane or cyclohexanol, but it is desirable to find alternative processes for the preparation of adiponitrile which do not involve the use of cyclic compounds.

For this purpose, it has been proposed to hydrodimerise acrylonitrile by electrochemical processes either using amalgams of alkali metals in the presence of water, or by a two-stage chemical process involving the intermediate formation of dicyanocyclobutane. In the first case, considerable quantities of mercury have to be employed which constitutes a considerable disadvantage on the industrial scale, and, in the second case, the formation of dicyanocyclobutane, followed by its decomposition into adiponitrile by hydrogenolysis, necessitates the use of high temperatures and pressures.

It has now been found that it is possible to prepare adiponitrile from acrylonitrile directly in a single stage and under moderate operating conditions by a process which comprises heating together a mixture of (a) acrylonitrile, (b) a metal carbonyl or metal carbonyl derivative (as hereinafter defined), (c) hydrogen or a substance causing the release of hydrogen in the reaction mixture, and (d) a polymerisation inhibitor. It is generally preferred, though it is not essential, to carry out the process in the presence of a hydrogenation inhibitor.

The metal carbonyls which can be used include more particularly, those of the transition metals such as $Fe(CO)_5$, $Fe_2(CO)_9$, $Fe_3(CO)_{12}$, $Co_2(CO)_8$, and $Cr(CO)_6$. Iron pentacarbonyl and dicobalt octacarbonyl are preferred.

The term "metal carbonyl derivative" is used herein to denote compounds in which a carbon monoxide residue (CO) is bonded directly to a metal, the said metal being also covalently linked to one or more residues of other organic or inorganic compounds. Preferred such derivatives are those formed by reacting iron pentacarbonyl and dicobalt octacarbonyl with acrylonitrile, and the compound triethyl ammonium undecacarbonyl triferrate. Other suitable derivatives include, for example, the metal carbonyl hydrides and the other organometallic complexes formed by the reaction of metal carbonyls with unsaturated organic compounds, e.g. mono- and di-olefinic and acetylenic compounds, for example butadiene.

Any substance (or mixture of substances) capable of causing the release of hydrogen under the operating conditions may be employed provided that it produces no, or substantially no, considerable side reactions. More particularly, the substance (c) may be water alone or a mixture of water and an electron donor of the kind called Lewis bases. Suitable Lewis bases include: metal hydroxides, such as hydroxides of the alkali and alkaline-earth metals, more particularly sodium and potassium hydroxides; oxides such as magnesia and alumina; alkaline salts such as sodium carbonate, sodium bicarbonate, borax, monosodium phosphate, monopotassium phosphate and dipotassium phosphate, amines or amine derivatives such as tetraethylammonium toluene-p-sulphonate, N-cyanoethyldiethylamine, ethylenediamine, o-phenanthroline, $\alpha$, $\alpha'$-dipyridyl, piperidine, pyrimidine, N-cyanoethylpyrrolidine, diazabicyclooctane, tetramethylethylenediamine and the trialkylmonoamines. The preferred amino compounds are tertiary amines. Phosphines, arsines and stibines, more particularly triphenylphosphine and triphenylstibine may also be used as Lewis bases.

Since metal carbonyls are capable of giving carbonyl-containing complexes with certain amines, it is also possible to replace the carbonyl derivative (b) and the substance (c) causing the release of hydrogen in the reaction mass by a previously formed complex of the two.

The polymerisation inhibitor may be of any known such inhibitor, e.g., hydroquinone, methylene blue or p-nitrosodimethylaniline. The hydrogenation inhibitor, when used in preferably quinoline.

Thus in one embodiment of the invention, a mixture of acrylonitrile, metal carbonyl, a polymerisation inhibitor and, optionally, a hydrogenation inhibitor is heated in the presence of molecular hydrogen. Alternatively, a mixture of acrylonitrile, metal carbonyl, a Lewis base and/or water, a polymerisation inhibitor, and, optionally, hydrogenation inhibitor, is heated in the presence or absence of hydrogen.

The proportion of metal carbonyl or derivative thereof (b) may vary within wide limits, depending upon the operating conditions. When the compound (c) employed is molecular hydrogen only, the quantity of carbonyl compound (b) may be relatively low, proportions as small as 0.01 mole of carbonyl compound to 1 mole of acrylonitrile being effective. On the other hand, when (c) is aqueous, with or without a Lewis base, the quantities of carbonyl compound (b) required must be greater in order to obtain satisfactory yields, all other factors remaining the same. Generally speaking, however, good results are obtained using not more than 0.2 mole of carbonyl compound (b) per mole of acrylonitrile, though there is no major disadvantage in employing quantities of carbonyl compound (b) greater than this, whatever the operating conditions, since, if desired, the excess can be recovered.

When in the process of the invention compound (c) is molecular hydrogen, the hydrogen may be employed under an initial pressure of 5 to 100 bars, and in most cases, a pressure of 25 to 50 bars is quite suitable. The hydrogen may optionally be diluted with a gas which is inert under the operating conditions such as, for example, nitrogen.

When the process is carried out using a substance causing the release of hydrogen as compound (c), it is unnecessary to use any molecular hydrogen, and the operation can be simply carried out at atmospheric pressure or in an autoclave, under the autogenous pressure of the reactants. Molecular hydrogen may however also be simultaneously present, and this may be advantageous in some cases, at least with certain hydrogen pressures. Generally speaking, an appropriate hydrogen pressure before any heating begins is between 5 and 100 bars, as in the case where hydrogen only is used.

When compound (c) is a mixture of water and a Lewis base, e.g. a tertiary amine, it is generally satisfactory to use an amount of water equal to 1 to 75% by weight of the acrylonitrile and an amount of Lewis base from 1 to 20% by weight of the acrylonitrile.

If unstabilised acrylonitrile is employed as starting material, it is necessary to add initially to the reaction mixture 0.0005 to 0.01 mole of a polymerisation inhibitor per mole of acrylonitrile. When a hydrogenation inhibitor is used, a proportion of 0.0005 to 0.01 mole per mole of acrylonitrile is satisfactory.

The temperature of the reaction may vary within wide limits, from 20° to 200° C., depending upon the operating conditions, and the duration of the reaction may be from 1 to 48 hours. In the majority of cases, the best results are obtained by operating at temperatures of 90° to 120° C. for 12 to 20 hours.

Although the conversion of acrylonitrile into adiponitrile may take place without using any materials other than those discussed, it is advantageous in some cases to use diluents which are inert under the operating conditions. Thus, when the process is carried out in the presence of a metal carbonyl and molecular hydrogen only (as compounds (b) and (c) respectively), it may be advantageous to dilute the reaction mixture with benzene.

In the course of the reaction, various by-products are formed, including more particularly propionitrile. This latter product, which is worth recovering, can be separated from the reaction product by fractional distillation and passes over at the beginning of the distillation with the unconverted acrylonitrile. The most volatile fraction which contains both substances may be re-used as such in a subsequent operation, as the propionitrile does not interfere with the hydrodimerisation reaction. The unconverted carbonyl derivative may also be separated from the reaction mass and re-used. If the carbonyl compound is volatile, it is recovered with the unconverted acrylonitrile. Thus, by adjusting the proportions of the various reactants, the recovered products can be re-used and the operation may be carried out continuously.

In the process of the invention, the carbon monoxide and various other volatile reaction products are normally eliminated when the process is carried out under normal atmospheric pressure. These products may also be advantageously eliminated when the process is carried out in an autoclave under pressure by degassing as the reaction proceeds.

In this embodiment of the invention the acrylonitrile and the other reactants hereinbefore referred to under (b), (c) and (d) are introduced into the autoclave, which is then brought to the chosen temperature. The initial internal pressure, which may be equal to atmospheric pressure when (c) is solely a mixture of water and a Lewis base, or which may be above atmospheric pressure when the operation is carried out in the pressure of hydrogen, increases as soon as heating is applied. When the temperature chosen for the reaction has been reached, degassing, which may be either continuous or discontinuous, is effected. Conveniently, the degassing may be carried out in such a manner as to maintain a constant pressure. When the operation is carried out in the pressure of hydrogen, either all the hydrogen may be introduced at the outset, or a certain quantity of hydrogen may be introduced at the outset and further hydrogen introduced into the autoclave during the course of the operation, with partial degassing, the hydrogen inlet and the degassing orifice naturally being situated at different points of the autoclave. After the introduction of the reactants into the autoclave, it is furthermore possible, before heating, to introduce nitrogen or any other gas which is inert under the operating conditions, under a pressure which may be, for example, between 1 and 100 bars. For performing the process under pressue with degassing, use is advantageously made of an autoclave, above which is mounted a reflux condenser with a degassing valve in the upper part of the condenser. In this way, the reactants vapourised at the reaction temperature are condensed by the condenser and the degassing liberates only noncondensible decomposition products. When the reaction is complete, as shown by the absence of a pressure increase when the degassing valve is closed, the product is cooled and filtered, and the filtrate obtained is distilled. The head fraction, which contains an excess of acrylonitrile with a little propionitrile, may be reused as such, as described earlier in the specification.

The following examples illustrate the invention.

Example 1

Into a 125-cc. stainless steel autoclave previously purged with nitrogen are charged: 20 cc. of acrylonitrile, 250 mg. of hydroquinone, 3.6 g. of aqueous sodium hydroxide solution (of concentration 50 g./100 cc.), and 2.8 cc. of iron pentacarbonyl, and hydrogen is then introduced to a pressure of 85 bars. After heating at 100° C. for 15 hours with stirring, followed by cooling to ambient temperature, the autoclave is degassed, and the reaction mass, which is a slightly viscous red liquid containing particles in suspension, is filtered and the residue (3.9 g.) washed with 20 cc. of acetone.

The volatile fraction of the filtrate, including unreacted acrylonitrile, is eliminated under a partial vacuum (e.g. that of water jet pump), at temperatures up to 60° C. A red viscous residue remains, which is distilled in vacuo, and 1.85 g. of a fraction distilling at 111–120° C. under 0.65 mm. Hg and of refractive index $n_D^{25} = 1.4412$ are obtained. The residue, which is composed of polymerised products, weighs 4.7 g. The latter fraction is identified by its infra-red spectrum as adiponitrile. By treating 1.5 g. of the fraction with 10 cc. of sulphuric acid (at a concentration of 50 g./100 cc..), 1.85 g. of an acid whose melting point (150° C.) is not lowered by mixing with adipic acid, are obtained.

Example 2

The procedure of Example 1 is followed, but in addition 2 cc. of quinoline are added to the reaction mixture, and the hydrogen is introduced to a pressure of only 60 bars. 3.1 g. of residues and 2.9 g. of adiponitrile are thus obtained.

Example 3

The procedure of Example 2 is followed, but without hydrogen, the atmosphere in contact with the reactants being nitrogen at atmospheric pressure. 3.4 g. of residues and 1.9 g. of adiponitrile are obtained.

Example 4

Into a 125-cc. stainless steel autoclave are charged 20 cc. of acrylonitrile, (water in an amount shown in the table below), a nitrogeneous organic base (as indicated in the table below), 0.5 g. of hydroquinone and 2.8 cc. of iron pentacarbonyl, and hydrogen is optionally introduced to the pressure shown in the table. The mixture is then agitated at the desired temperature for a given time. After the usual working up treatments, a fraction boiling at 96–105° C. and containing at least 90% adiponitrile is isolated by distillation under a reduced pressure of 0.2 mm. Hg.

The conditions and results of the experiments are set out in the following table:

| Water in cc. | Nitrogeneous organic base | Initial hydrogen pressure (in bars) | Temperature (° C.) | Duration of reaction (in hours) | Weight of the fraction containing the adiponitrile (g.) |
|---|---|---|---|---|---|
| 6 | 3 cc. of tributylamine | 60 | 80 | 15 | 2 |
| 6 | 2.5 g. of N-cyanoethyl-pyrrolidine. | 0 | 80 | 36 | 2 |
| 2 | 1 g. of o-phenanthroline | 50 | 100 | 16 | 2.5 |
| 6 | 0.25 g. of diazabicyclooctane | 0 | 110 | 16 | 2.7 |

Example 5

Into a 100-cc. round-bottomed flask provided with a stirrer and purged with nitrogen are introduced 16 g. (0.3 mole) of acrylonitrile (stabilised with traces of hydroquinone) and 25 cc. of a dicobalt octacarbonyl solution in cyclohexane titrating 4.34% of Co (1.08 g. of Co, i.e. 0.018 gram-atom).

The temperature is raised in half an hour to 64° C. (reflux temperature) and the reflux is maintained for one hour. 1324 cc. (measured at 0° C. and 760 mm.) of CO are evolved, i.e., 80% of the theoretical volume corresponding to total decomposition of the dicobalt octacarbonyl. A maroon powder is deposited, which is separated from the cyclohexane solution by filtration under nitrogen. This powder is washed with 3×25 cc. of petroleum ether (B.P. 55–60° C.) in the absence of air, and 3.3 g. of powder titrating 25.2% of Co are obtained, the infra-red spectrum of which shows a band at 2185 cm.$^{-1}$ corresponding to the conjugate nitrile group and three bands at 1860, 1970 and 2020 corresponding to the carbonyl, but no bands at 2222 or 1698 cm.$^{-1}$.

Into a 125-cc. stainless steel autoclave purged with nitrogen are charged the maroon precipitate, 1 cc. of quinoline, 1 g. of hydroquinone and 20 cc. of acrylonitrile. The autoclave is seated, hydrogen is introduced to a pressure of 46 bars, and the contents are heated at 60° C. for 16 hours. After cooling and degassing, the contents of the autoclave are filtered under nitrogen and the filtrate is distilled first under normal pressure (when 12 cc. of unreacted acrylonitrile are recovered), and then under reduced pressure. 0.8 g. of a fraction boiling at 92–112° C. under 0.25 mm. Hg is thus obtained, containing 80% of adiponitrile, the identity of which is verified by hydrolysis to adipic acid.

Example 6

Into a 500-cc. autoclave are charged 39.5 g. of acrylonitrile, 50 cc. of benzene, 2 g. of hydroquinone, 1 g. of quinoline and 12 g. of an acrylonitrile/cobalt carbonyl derivative prepared as in the preceding example, and the reaction is carried out under the same conditions as in the latter example. 2.3 g. of a fraction boiling at 92–112° C. under 0.25 mm. Hg are thus obtained, containing 90% of adiponitrile, the quantity of acrylonitrile recovered being 32.15 g. This is a yield of 31% calculated on the converted acrylonitrile.

Example 7

Into a 125-cc. stainless steel autoclave are charged 20 cc. of acrylonitrile, 12 cc. of water, 1 cc. of triethylamine, 0.5 g. of hydroquinone, and 4.2 cc. of iron pentacarbonyl. The autoclave is closed and then agitated for 5 hours at 100° C. under the autogeneous pressure of the reactants, which reaches 18 bars at the end of the reaction. The autoclave is cooled and degassed. The reaction product comprises two phases: a lower aqueous phase containing a mineral product in suspension, and an upper organic phase which is reddish-brown and clear. After separation of the mineral product by filtration (its dry weight is 2.9 g.), the two liquid layers are separated. The aqueous layer is extracted with 10 cc. of diethyl ether and the ethereal extract is combined with the organic layer. The organic solution is then distilled on the water bath to remove the diethyl ether and the acrylonitrile. Distillation of the residue under 0.2 mm. Hg then gives 3.6 g. of a fraction boiling at 90–98° C. and containing 90% of adiponitrile (as determined by chromatography), leaving 1.3 g. of undistilled residue.

Example 8

Into a 500-cc. stainless steel autoclave are introduced: 53 g. of acrylonitrile stabilised with traces of hydroquinone, 25 g. of water, 5 cc. of triethylamine, and 13.9 cc. of iron pentacarbonyl. The autoclave is closed and brought to 105° C. for 5 hours. The pressure rises to 15 bars. The autoclave is cooled and degassed and the reaction mass is worked up as in Example 1. On distillation of the organic phase, 24 g. of acrylonitrile and 3.2 g. of propionitrile are recovered and then 12.7 g. of a fraction boiling at 99–106° C. under 0.4 mm. Hg and containing 90% of adiponitrile are obtained. The residue weighs 6.9 g. There is therefore obtained, for a conversion of 55%, an adiponitrile yield of 38% calculated on the acrylonitrile consumed.

Example 9

Into a 125-cc. stainless steel autoclave are charged: 20 cc. of acrylonitrile stabilised by traces of hydroquinone, 1 cc. of water, and 2 g. of triethylammonium undecarbonyl triferrate, prepared in accordance with the method of Case and Whiting, J. Chem. Soc., p. 4635 (1960). A hydrogen pressure of 80 bars is established in the autoclave which is then heated for 15 hours at 80° C. with stirring. By fractional distillation, there are separated 0.4 g. of a fraction distilling at 95–100° C. under 0.4 mm. Hg and containing 50% of adiponitrile, and 2.5 g. of a fraction distilling at 100–115° C. under 0.4 mm. Hg and containing 90% of adiponitrile.

Example 10

Into a 500-cc. stainless steel autoclave are charged: 53 g. (66.25 cc.) of acrylonitrile stabilised by traces of hydroquinone 19.6 g. (13.4 cc.) of iron pentacarbonyl, and 0.3 g. of methylene blue. With a mixture of 40% by volume of hydrogen and 60% by volume of nitrogen, a pressure of 50 bars at is set up, and the autoclave is heated with stirring at 113° C. for 16 hours. After cooling and degassing, the volatile fractions are eliminated by evaporation in vacuo. On fractional distillation of the residue, 55 cc. of a light fraction distilling below 95° C. under 0.4 mm. Hg and 7.2 cc. (5.7 g.) of a fraction boiling at 95–115° C. under 0.35 mm. Hg containing 88% of adiponitrile, are recovered. The light fraction, contains 28.16 g. of acrylonitrile and 16.5 g. of non reacted iron pentacarbonyl, may be re-used in a subsequent operation.

Example 11

Into a 125-cc. stainless steel autoclave are charged: 20 cc. of acrylonitrile, 12 cc. of water, 4.2 cc. of iron pentacarbonyl, 0.5 g. of hydroquinone, and 2 g. of triphenylphosphine. The autoclave is closed and the contents are then stirred for 15 hours at 100° C. under the autogenous pressure of the reactants. The autoclave is cooled and degassed. The reaction product comprises two phases, a lower aqueous phase containing a mineral product in suspension, and an upper clear organic phase. After filtration of the mineral solid, the two liquid layers are separated. The aqueous layer is extracted with 10 cc. of diethyl ether and the ethereal extract is combined with the organic layer. The organic solution is then distilled on the water bath to eliminate the diethyl ether and the acrylonitrile. Distillation of the residue under 0.3 mm. Hg gives 1.15 g. of a fraction boiling at 98–110° C. and containing 85% of adiponitrile.

Example 12

The procedure of Example 11 is followed, but with the following proportions of reactants: 20 cc. of acrylonitrile, 4 cc. of water, 4.2 of iron pentacarbonyl, 0.5 g. of hydroquinone, and 3 g. of triphenylstibine. 1.6 g. of a fraction containing 1.23 g. of adiponitrile is finally obtained by distillation under 0.3 mm. Hg between 98° and 110° C.

Example 13

The procedure of Example 11 is followed, but with the following quantities of reactants: 20 cc. acrylonitrile, 6.4 cc. of water, 3.5 g. of dipotassium phosphate ($K_2HPO_4$), 2.8 cc. of iron pentacarbonyl, and 0.5 g. of hydroquinone. After treatment as indicated in Example 11, 2.7 g. of a fraction boiling at 90–110° C. under 0.3 mm. Hg and containing 2 g. of adiponitrile are isolated.

Example 14

Into a stainless-steel autoclave having a capacity of 750 cc. and provided with a stirrer, a reflux condenser adapted to operate under pressure and a degassing valve disposed in the upper part of the condenser, are introduced under a nitrogen atmosphere: 159 g. of acrylonitrile (3 mol.) stabilised by 0.05 parts per 1000 of ammonia; 39.2 g. of iron pentacarbonyl (0.2 mol.); and 20 g. of water.

Under an initial nitrogen pressure of 5 bars, the temperature is brought to 130–135° C. When this temperature has been reached, the pressure is 8 bars; the heating is continued at this temperature, the pressure being maintained at 8 bars by continuous degassing at the top of the condenser. When the pressure shows no further tendency to rise if degassing is stopped, i.e. at the end of 7 hours, the operation is discontinued. The quantity of gas collected, which consists essentially of carbon monoxide, is 20 litres.

After cooling, the reaction mass is filtered, leaving a mineral residue which is washed on the filter using two 50 cc. portions of acrylonitrile (80 g. in all). The filtrate is then distilled under normal pressure to recover both the washing acrylonitrile and the unconverted acrylonitrile, a total of 193.4 g., and then subjected to fractional distillation in vacuo, which yields a 14.1 g. fraction of adiponitrile distilling at 105–109° C. under a vacuum of 0.9 mm. Hg.

A further 24.3 g. of acrylonitrile are separated from the mineral residue by evaporation. The thus dried mineral product (17.9 g.) may be converted into iron pentacarbonyl after reduction and treatment with carbon monoxide. The yield of adiponitrile is 66% calculated on the acrylonitrile consumed.

The same experiment carried out without degassing and with heating for 8 hours at 130° C. yielded only 5 g. of a fraction of dimeric products having an adiponitrile content of 80%.

Example 15

Into an apparatus identical to that of Example 14 are introduced under a nitrogen atmosphere: 26.5 g. of acrylonitrile (0.5 mol.) stabilised by 0.05 parts per 1000 of ammonia: 39.2 g. of iron pentacarbonyl (0.2 mol.); 39.6 cc. of water; and 33 cc. of dioxan.

The heating is begun under an initial nitrogen pressure of 5 bars and the temperature raised to 130–136° C., which temperature is maintained for 13 hours with continuous degassing for 10 hours 15 minutes (volume of gas collected: 22.2 litres). After cooling, the autoclave is then purged with nitrogen; the mineral residue separated by filtration is washed on a filter with 150 cc. of acetone. The filtrate is concentrated by distillation at normal pressure to eliminate the solvents and the unreacted acrylonitrile. Distillation is then effected under a vacuum of 0.3 mm. Hg which gives the following fractions: B.P. 56–102° C./0.3 mm. Hg, 1.3 g. (mixture of acrylamide and adiponitrile); B.P.=102–128° C./0.3 mm. Hg, 12.4 g; and a residue of 2.2 g. The fraction weighing 12.4 g. is found to contain 12.18 g. of adiponitrile by vapour phase chromatography. The yield is 45.1% calculated on the acrylonitrile introduced.

As in the preceding example, the metallic residue collected on the filter (17.1 g.) may be converted into iron pentacarbonyl by reduction followed by treatment with carbon monoxide.

Example 16

Into an apparatus identical to that of Example 14, 159 g. of acrylonitrile stabilised with 0.05 parts per 1000 of ammonia, 30.2 g. of iron dodecacarbonyl; and 20 g. of water are introduced, followed by nitrogen to a pressure of 5 bars. The temperature of the mixture is raised to 130–135° C., and the pressure then reaches 14 bars. The pressure is maintained constant at this value by continuous regassing for 4 hours 45 minutes. The reaction mass is then treated as indicated in Example 1, and 13.4 g. of adiponitrile are thus collected. The yield is 67% calculated on the acrylonitrile consumed.

Example 17

Into an autoclave having a capacity of 6 litres, 1590 g. of acrylonitrile (30 mol.) stabilised by 0.05 part per 1000 of ammonia; 786 g. of iron pentacarbonyl (4 mol.); and 400 g. of water are charged under a nitrogen atmosphere, and the nitrogen pressure is then raised to 5 bars. The temperature is raised to 130–135° C. and the heating is continued for 9 hours, the pressure being maintained at 8 bars by continuous degassing. After cooling, the product is filtered and the precipitate on the filter is washed with 1694 g. of acrylonitrile. The reaction mass is then concentrated to recover the unreacted acrylonitrile and the washing acrylonitrile (2744 g.), whereafter the residue is subjected to fractional distillation under a high vacuum. 334 g. of adiponitrile are thus isolated. The yield is 62%.

Example 18

Into an apparatus identical to that of Example 14, 159 g. of acrylonitrile stabilised by 0.05 part per 1000 of ammonia; 76.2 g. of iron pentacarbonyl; and 45 g. of water are charged under a nitrogen atmosphere.

A nitrogen pressure of 5 bars is established and the temperature is raised to 130–135° C. with partial degassing of the autoclave, in such manner as to maintain the pressure in the neighbourhood of 8 bars. After 1 hour 45 minutes, without any interruption of the reaction, 39.2 g. of iron pentacarbonyl and 20 g. of water are introduced into the autoclave through an airlock, and heating is continued with partial degassing. At the end of 6 hours, the heating is interrupted and, after cooling, the product is filtered and the precipitate on the filter is washed with 321 g. of acrylonitrile. The filtrate is then concentrated by distillation at normal pressure, whereby it is possible to recover 416 g. of acrylonitrile. On fractional rectification of the residue, 50 g. of adiponitrile are collected which corresponds to a 78% yield calculated on the acrylonitrile consumed and a 40% conversion.

We claim:

1. Process for the preparation of adiponitrile which comprises heating together at 20° to 200° C. and under a pressure up to 100 bars a mixture of (a) acrylonitrile, (b) 0.01 to 0.2 mole per mole of acrylonitrile of a compound selected from the class consisting of iron pentacarbonyl, iron dodecacarbonyl, triethylammonium undecacarbonyltriferrate, and the compounds formed by reacting iron pentacarbonyl with acrylonitrile, (c) a reducing agent selected from the class consisting of hydrogen and substances causing the release of hydrogen in the reaction mixture, and (d) a polymerisation inhibitor.

2. Process according to claim 1 in which the said mixture also contains a hydrogenation inhibitor.

3. Process according to claim 2 in which the said hydrogenation inhibitor is quinoline.

4. Process according to claim 2 in which the said mixture contains 0.0005 to 0.01 mole of hydrogenation inhibitor per mole of acrylonitrile.

5. Process according to claim 1 in which the hydrogen pressure is 25 to 50 bars.

6. Process according to claim 1 in which the mixture is heated in the presence of, as the reducing agent (c), water or a mixture of a Lewis base and water.

7. Process according to claim 6 in which the Lewis base is a tertiary amine.

8. Process according to claim 6 in which the amount of water used is 1 to 75% by weight, and the amount of Lewis base 1 to 20% by weight, of the acrylonitrile.

9. Process according to claim 1 in which the amount of polymerisation inhibitor (d) used is 0.0005 to 0.01 mole per mole of acrylonitrile.

10. Process according to claim 1 in which the reaction is carried out at 90° to 120° C.

11. Process according to claim 1, wherein degassing is carried out to eliminate, as the reaction progresses, carbon monoxide and other volatile compounds formed under the conditions of the reaction.

References Cited

UNITED STATES PATENTS

| 3,096,360 | 7/1963 | Sennewald et al. | 260—464 |
| 3,206,498 | 9/1965 | Schreyer | 260—465.8 |

JOSEPH P. BRUST, *Primary Examiner.*

U.S. Cl. X.R.

260—465.1